(12) United States Patent
Hallundbæk

(10) Patent No.: US 9,194,976 B2
(45) Date of Patent: Nov. 24, 2015

(54) LOGGING TOOL

(75) Inventor: Jørgen Hallundbæk, Græsted (DK)

(73) Assignee: WELLTEC A/S, Allerød (DK)

( * ) Notice: Subject to any disclaimer, the term of this patent is extended or adjusted under 35 U.S.C. 154(b) by 239 days.

(21) Appl. No.: 13/997,508

(22) PCT Filed: Dec. 21, 2011

(86) PCT No.: PCT/EP2011/073622
§ 371 (c)(1),
(2), (4) Date: Jun. 24, 2013

(87) PCT Pub. No.: WO2012/085106
PCT Pub. Date: Jun. 28, 2012

(65) Prior Publication Data
US 2013/0277546 A1  Oct. 24, 2013

(30) Foreign Application Priority Data
Dec. 22, 2010 (EP) .................................. 10196421

(51) Int. Cl.
*G01V 5/08* (2006.01)
(52) U.S. Cl.
CPC ........................ *G01V 5/08* (2013.01)
(58) Field of Classification Search
CPC .................................. G01V 5/00; G01V 5/08
USPC ....................................................... 250/269.1
See application file for complete search history.

(56) References Cited

U.S. PATENT DOCUMENTS

| | | | |
|---|---|---|---|
| 2,950,393 A | 8/1960 | Southward | |
| 3,183,358 A | 5/1965 | Cooley | |
| 4,228,350 A * | 10/1980 | Paap et al. | 250/267 |
| 5,205,167 A * | 4/1993 | Gartner et al. | 73/152.14 |
| 5,481,105 A | 1/1996 | Gold | |
| 6,552,333 B1 | 4/2003 | Storm et al. | |
| 2004/0020646 A1 | 2/2004 | Flecker et al. | |
| 2004/0079526 A1 * | 4/2004 | Cairns et al. | 166/255.2 |

(Continued)

FOREIGN PATENT DOCUMENTS

DE  10 2005 028 443  12/2006

OTHER PUBLICATIONS

International Preliminary Report on Patentability cited in International Patent Application No. PCT/EP2011/073622 dated Jul. 4, 2013.

(Continued)

*Primary Examiner* — Casey Bryant
(74) *Attorney, Agent, or Firm* — Nixon & Vanderhye P.C.

(57) ABSTRACT

The present invention relates to a logging tool for logging formational changes in a borehole, the logging tool having a longitudinal axis. The logging tool comprises a radiating source (5) for emitting an interaction signal, a detector (6) for detecting a reaction signal, and a screen (7) for limiting a volume (53) investigated by the radiating source and the detector, wherein the tool comprises a first part (8) and a second part (9), the second part being able to rotate around the longitudinal axis relative to the first part during use, and the second part comprising the screen (7), and wherein a speed of rotation of the second part is controlled by the rotation unit to be proportional to an output signal of the detector. Furthermore, the present invention relates to a method of characterizing a geological formation surrounding a borehole by a logging tool according to the present invention.

14 Claims, 5 Drawing Sheets

(56) References Cited

U.S. PATENT DOCUMENTS

2008/0061225 A1* 3/2008 Orban et al. ............... 250/269.3
2009/0276158 A1 11/2009 Kirkwood et al.

OTHER PUBLICATIONS

International Search Report for PCT/EP2011/073622, mailed Jun. 1, 2012.

* cited by examiner

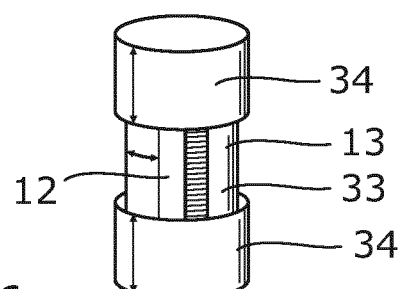
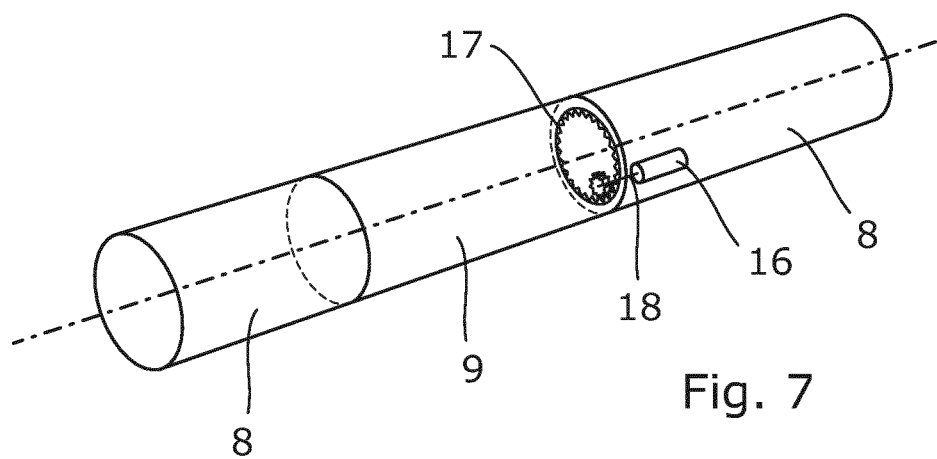
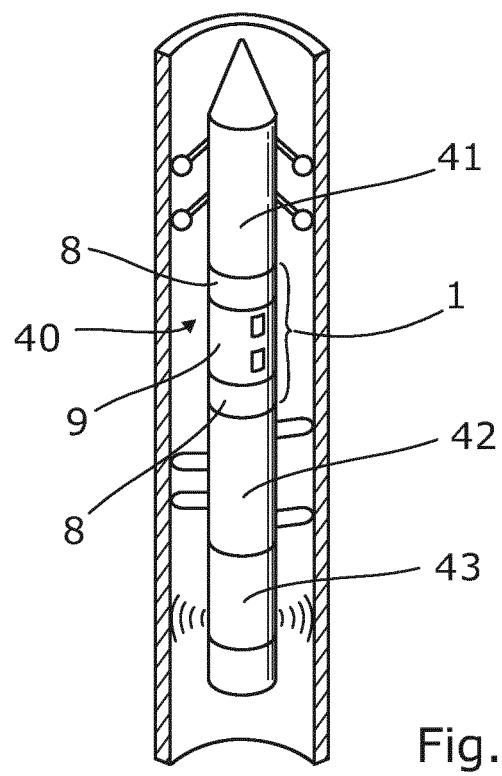

LOGGING TOOL

This application is the U.S. national phase of International Application No. PCT/EP2011/073622, filed 21 Dec. 2011, which designated the U.S. and claims priority to EP Application No. 10196421.2, filed 22 Dec. 2010, the entire contents of each of which are hereby incorporated by reference.

FIELD OF THE INVENTION

The present invention relates to a logging tool for logging formational changes in a borehole, the logging tool having a longitudinal axis. The logging tool comprises a radiating source for emitting an interaction signal, a detector for detecting a reaction signal, and a screen for limiting a volume investigated by the radiating source and the detector. Furthermore, the present invention relates to a method of characterising a geological formation surrounding a borehole by a logging tool according to the present invention.

BACKGROUND ART

The characteristics of geological formations surrounding a borehole are of significant interest in the exploration, production and monitoring of subsurface water and mineral deposits, such as oil and gas. A variety of techniques has been developed to measure and evaluate subsurface characteristics to determine certain characteristics of geological formations of interest.

These techniques typically include subsurface deployment of tools having energy sources to a radiated signal into the formations. The emitted energy interacts with the surrounding formations to produce signals that are detected and measured by one or more detectors also placed on the tool. The detected signal data are processed, and a log of the subsurface properties is transmitted to the surface.

A variety of logging techniques have been developed to evaluate subsurface formation by electromagnetically radiated waves, such as emission of neutrons into the formation, and e.g. evaluating the results of neutron interactions with the formation nuclei.

Properties of the geological formations which may be determined by means of radiation include formation density, porosity, carbon oxygen ratios, concentration of various chemical elements, properties of fluids and more.

Increased knowledge on the surroundings of the borehole leads to optimised drilling and production performance, thereby minimising costs and maximising return. During drilling and exploitation of a well, the well is typically continuously investigated further to reveal new possible branches of the well which might be exploited. The more detailed knowledge about the surroundings of the borehole that can be extracted from non-destructive measurements trough the casing of the borehole, the more the well can be investigated during operation without risking limitation in production time.

There is thus a need to be able to investigate the geological formation surrounding boreholes during exploration, production and monitoring of subsurface water and mineral deposits, such as oil and gas.

SUMMARY OF THE INVENTION

It is an object of the present invention to wholly or partly overcome the above disadvantages and drawbacks of the prior art. More specifically, it is an object to provide an improved system for investigating the geological formation surrounding boreholes during exploration, production and monitoring of subsurface water and mineral deposits, such as oil and gas.

The above objects, together with numerous other objects, advantages, and features, which will become evident from the below description, are accomplished by a solution in accordance with the present invention by a logging tool for logging formational changes in a borehole, the logging tool having a longitudinal axis, comprising
 a radiating source for emitting an interaction signal,
 a detector for detecting a reaction signal, and
 a screen for limiting a volume investigated by the radiating source and the detector,
wherein the tool comprises a first part and a second part, the second part being able to rotate around the longitudinal axis relative to the first part during use, and the second part comprising the screen, and wherein a speed of rotation of the second part is controlled by the rotation unit to be proportional to an output signal of the detector.

In an embodiment, the second part may be able to rotate by means of a rotation unit, such as an electrical motor unit.

The rotation unit may be arranged in the second part.

Alternatively, the rotation unit may be arranged in the first part.

Furthermore, a speed of rotation of the second part may be controlled by the rotation unit to be proportional to an output signal of the detector.

Also, the radiating source may be arranged off centre at an offset distance perpendicular to the longitudinal axis in the logging tool.

In another embodiment, a size of a split opening of the second part may be controlled by at least one collimating unit to be proportional to an output signal of the detector.

Furthermore, a speed of the logging tool in a direction defined by the longitudinal axis of the tool may be controlled by a driving unit to be proportional to an output signal of the detector.

The second part may comprise the radiating source.

Moreover, the second part may comprise the detector.

Additionally, the screen may limit a volume detectable by the detector when detecting the reaction signal.

Also, the screen may limit a radiated volume.

In addition, the screen may comprise an opening.

Furthermore, the screen may comprise projections for collimating the radiation or the reaction signal.

Moreover, the screen may comprise a groove.

Additionally, the screen may comprise two fixed rings for collimating either the interaction signal, the reaction signal or both in the longitudinal direction in order to create a fixed longitudinal collimation.

Furthermore, the screen may comprise outer rings axially movable across the radiating source in the longitudinal direction.

In addition, the screen may comprise a monochromator unit.

Also, the screen may comprise an optical focusing unit.

Moreover, the screen may comprise a shielding unit and at least a collimating unit, the collimating unit being able to shield at least apart of the surroundings not shielded by the shielding unit, and wherein a size of the slit opening can be controlled by changing the position of the at least one collimating unit.

The screen may collimate the radiation exiting or entering the tool in one direction.

In an embodiment, the screen may comprise a shielding unit and at least a collimating unit, the shielding unit and the collimating unit being concentrically positioned, and wherein the size of the slit opening can be controlled by the shielding unit and at least one collimating unit rotating in relation to each other.

Moreover, the screen may comprise a shielding unit, at least a tangential collimating unit and at least a longitudinal collimating unit, the tangential collimating unit being movable in a tangential direction in order to shield at least a part of the surroundings unshielded by the shielding unit, wherein the opening of the screen has a longitudinal dimension and a tangential dimension, wherein the tangential dimension of the opening of the screen can be controlled by changing the position of the at least a tangential collimating unit, and the longitudinal collimating unit being able to shield at least part of the surroundings unshielded by the shielding unit, and wherein a longitudinal dimension of the slit opening can be controlled by changing the position of the at least a longitudinal collimating unit.

Furthermore, the at least a tangential collimating unit and the at least a longitudinal collimating unit may move simultaneously.

Moreover, a cylinder may be arranged on the outside of the casing of the tool, the cylinder being able to move back and forth in the longitudinal direction.

In another embodiment, the logging tool may comprise a shielding unit and at least one collimating unit, the collimating unit comprising a variable double slit opening for collimating the radiation exiting or entering the tool in two directions.

Moreover, the collimating unit may be sliding panels capable of shielding at least part of the surroundings unshielded by the shielding unit.

Furthermore, the collimating units may be cylinders which can be displaced in order to shield at least a part of the surroundings unshielded by the shielding unit.

In an embodiment of the invention, the logging tool may comprise at least two screens; one for the radiating source and one for the detector.

Furthermore, the logging tool may comprise a positioning unit, wherein calculation of a position of the logging tool within the borehole is possible, e.g. by being determined by a conventional casing collar locator (CCL).

In addition, the logging tool may comprise a gyroscopic unit comprised within in the first part, wherein a calculated position of the logging tool is calibrated by means of the gyroscopic unit during use.

Further, the logging tool may comprise a downhole data processing means for pre-processing acquired data downhole prior to sending information to an uphole data processing means.

Finally the present invention relates to a method of characterising a geological formation surrounding a borehole by a logging tool as described above, comprising the steps of:
a) emitting a radiation signal towards the geological formation, such that the radiation signal interacts with the formation in a volume, thereby emitting a reaction signal,
b) detecting the reaction signal by the detector,
c) determining when the detected reaction signal succeeds a predetermined minimum count rate of the reaction signal,
d) rotating the second part in relation to the first part,
e) repeating steps a-d until the formation has been investigated in an entire radial circumference of the tool,
f) moving the tool in the borehole in the longitudinal direction, and
g) repeating steps a-f until the geological formation has been characterised in a desired length in the longitudinal direction.

BRIEF DESCRIPTION OF THE DRAWINGS

The invention and its many advantages will be described in more detail below with reference to the accompanying schematic drawings, which for the purpose of illustration show some non-limiting embodiments and in which FIG. 6 shows a perspective view of a system according to the invention, which allows tangential as well as longitudinal collimation of the radiated signal, FIG. 7 shows a transparent view of the logging tool with inserted rotation means, FIG. 8 shows a tool string comprising the logging tool in a borehole.

All the figures are highly schematic and not necessarily to scale, and they show only those parts which are necessary in order to elucidate the invention, other parts being omitted or merely suggested.

DETAILED DESCRIPTION OF THE INVENTION

Figure 1:
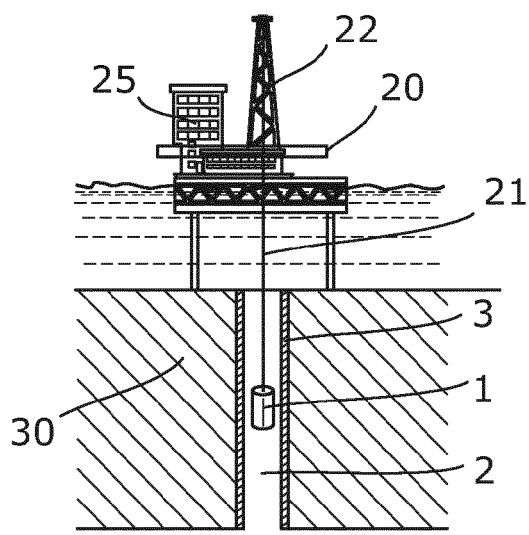
FIG. 1 shows a cut-through view of a borehole casing with a logging tool inserted.

FIG. 1 shows a logging tool 1 for characterising geological formations 30 surrounding a borehole 2, arranged in a casing 3 and submerged into a well via a wireline 21 from a rig or vessel 20. The logging tool 1 is primarily used for logging formational changes in a borehole 2 in order to optimise the hydrocarbon production. The logging tool 1 is connected to data acquisition means 25 at the surface via the wireline 21. The vessel 20 comprises a lowering means 22 in the form of a crane. The lowering means 22 is connected to the logging tool 1 via the wireline 21 for lowering the tool into the casing 3 of the borehole 2.

Figure 2:
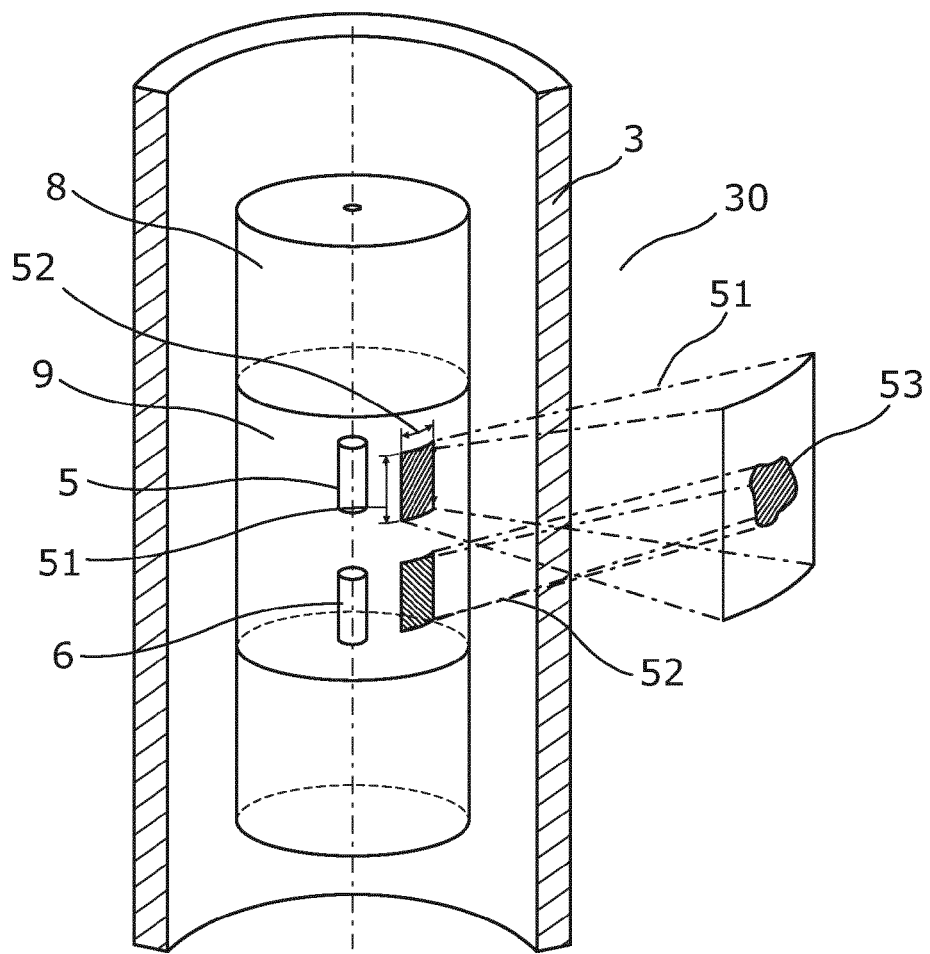
FIG. 2 shows a system according to the invention for analysing characteristics of geological formations.

As shown in FIG. 2, the logging tool 1 comprises a radiating source 5 and a detector 6 arranged within the housing of the tool with a predetermined distance between them. The radiating source 5 emits a radiation signal S1 towards the geological formation 30. The radiation signal S1 interacts with the formation 30, which results in a reaction signal S2 which is then detected by the detector 6 when the reaction signal S2 returns to the logging tool 1. By using a radiating source 5, such as a neutron source, the characterisation of the formation 30 can be carried out from inside the casing 3 since the radiation is able to penetrate the metal casing, thereby minimising the need for destructive penetration of the casing 3. The casing 3 often consists of a steel tubing having a wall thickness and a mainly circular cross-sectional form.

In FIG. 2, the radiating source 5 and detector 6 are shielded by a screen 7 for limiting a volume 53 of the formation 30 investigated by the radiating source. By only radiating a limited volume 53 of the formation 30, the resolution of any formational changes increases, thereby providing a user of the logging tool 1 with more detailed knowledge of the formational changes. The logging tool 1 comprises a first part 8 and a second part 9, and the second part has the ability to be rotated around a longitudinal axis A1 in relation to the first part. In FIG. 2, this rotation is indicated by an arrow. By rotating the second part 9 in relation to the first part 8, the surroundings may be investigated, e.g. by scanning the formation 30 in a discrete set of steps, dividing the 360 degrees around the axis of the logging tool 1 into a discrete number of volumes 53, investigating one volume at a time and then rotating the second part 9 stepwise without moving the first part 8 of the logging tool 1, and hence without moving the logging tool 1, and then investigating the next volume and so forth.

The volume 53 investigated by the logging tool 1 is the part of the volume radiated by the radiating source 5 that generates a reaction signal S2 which can be detected by the detector 6. The extent of the radiated volume 53 is determined by the opening of the screen 7 which has a longitudinal dimension 51 in a longitudinal direction parallel to the longitudinal axis A1 of the tool 1 as well as a tangential dimension 52 in a tangential direction following the circumference of the logging tool 1. Equivalently, the volume 53 detected by the detector 6 is determined by the longitudinal and tangential dimensions 51, 52 of the opening in the screen 7 defining the part of the surroundings visible to the detector 6. The volume 53 investigated by the logging tool 1 is illustrated in FIG. 2 in order to give a conceptual understanding of the invention, however, the form and extent of an investigated volume 53 when characterising materials using radiation can be far more complex depending on factors such as the radiated energy, the characteristics of the formation, circumstances regarding the casing and so on. The volume 53 is therefore defined as the part of the volume 53 radiated by the interaction signal S1 from which a reaction signal S2 is generated that can be detected by the detector 6. Furthermore, the screen 7 is arranged so that it shields the radiating source 5, and thus the radiated signal, or the detector 6, and thus the reaction signal S2, or both the radiating source and the detector.

During exploitation of a borehole 2, several other tools may be present in the borehole, as shown in FIG. 8, while logging data on the geological formation 30, and these tools will typically be connected to each other to form part of a tool string 40. The tool string 40 may be moved around in the borehole 2 by a driving unit 41, and the tool string may comprise an anchor tool 42 for fixing the position of the tool string in the borehole 2, or it may comprise other logging tools, such as a tool 43 for investigating a fluid inside the borehole 2. Therefore, a tool string 40 may be long and posses a variety of different tools with different functions.

Therefore, by rotating only the second part 9 of the logging tool 1, a complete 360 degree scan of the surroundings can be performed without moving the logging tool 1 or the tool string 40. By limiting the volume 53 investigated by the logging tool 1 using the screen 7, the resolution of the scan is increased. As an example, a full 360 degree rotation of the second part 9 is performed using eight 45 degree rotational steps and a radiated angle range of 45 degrees limited by the screen 7. The resolution may then, as an example, be increased by using twelve rotational steps instead and a radiated angle range of only 30 degrees limited by the screen 7 if a larger resolution is needed. This ability to perform 360 degree scans of the surroundings of the borehole 2 with a customised resolution can be chosen by the user independently of the movement of the logging tool 1 or the tool string 40.

Figure 9:
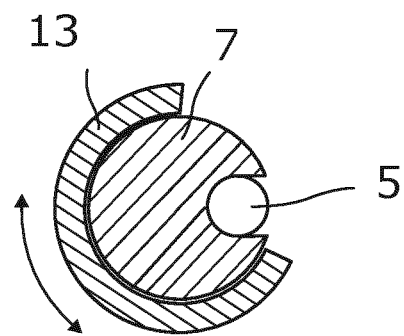
FIG. 9 shows a cross-sectional view of the logging tool.

In order to increase the range in which the formation may be investigated by the invention, the radiating source 5 may be arranged off centre at an offset distance perpendicular to the longitudinal axis in the logging tool as shown in FIG. 9, such that the attenuation of the radiation is limited. Especially when investigating very small volumes of formation it may be appropriate to ensure the highest possible intensity from the radiating source by placing the source closer to the volume to be investigated. Also, the detector 6 may be arranged off centre at an offset distance perpendicular to the longitudinal axis of the logging tool to be closer to the formation to diminish attenuation of the reaction signal S2.

The different logging tools in a tool string 40 may also be used to derive correlated data by means of different methods of investigation, since the distance between tools in a tool string would be known. For instance, if a relatively high number of casing cracks is discovered by a logging tool for characterising cracks, the data may be correlated with data from a logging tool 1 according to this invention, characterising the formation 30 behind the part of the casing 3 possessing an increased number of cracks. The correlated data in this way provides the user with information to take precautionary measures, e.g. to reinforce the casing for the casing to be able to brace special types of geological formation or brace the formation during formational changes known from previous correlated data to result in increased levels of cracks in the casing. Furthermore, if a certain tool for carrying out such precautionary measures is present in the tool string 40, the user may take the precautionary measures without having to resurface the tool string.

In FIG. 2, the radiating source 5 emits the interaction signal S1 interacting with the formation 30. A resulting reaction signal S2 holding information of the formation 30 can then be detected by the detector 6.

Figure 3:
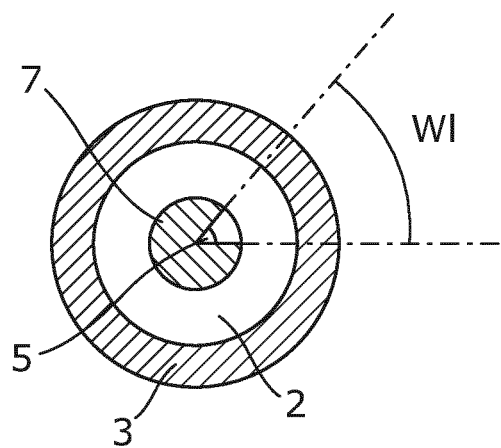
FIG. 3 shows a cross-sectional view of the logging tool.

In FIG. 3, a cross-sectional view of the tool 1 and casing 3 is shown. The radiating source 5 is arranged in the centre of the tool 1 and is surrounded by the screen 7, whereby the radiating source 5 only radiates the interaction signal S1 in a confined angle range, termed the opening angle W1 and illustrated by dotted lines in FIG. 3, extending radially from the source.

Figure 4:
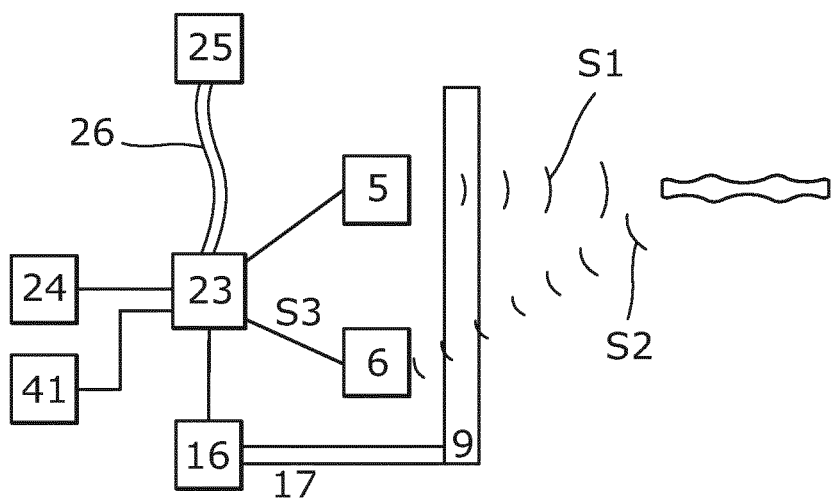
FIG. 4 shows a schematic view of the electrical connections sending and receiving information in a system according to the invention.

FIG. 7 shows a perspective view of the logging tool 1. The logging tool 1 comprises the first part 8 and the second part 9, and the second part can be rotated in relation to the first part 8 by a rotation unit 16, such as an electrical motor unit. The second part 9 may be rotated using either a direct link between the rotation means 16 and the second part 9 or using a connection means 17. To allow the user to scan the surroundings of the borehole 2 with the logging tool 1 as quickly as needed, the rotation may be done by a rotation unit 16, such as an electrical motor unit. In FIG. 7, the rotation unit 16 is arranged within the first part 8, but could equally be arranged within the second part 9. Since space is very limited, which is a general limitation in all borehole equipment, the rotation unit 16 may be placed close to the second part 9 if there is space, or it may be placed further away from the part 8, 9 that needs to be rotated and connected by a shaft 18. To produce the torque required to rotate the second part 9, a connection means 17, such as a gear, comprising differently sized cogs may connect the second part to the rotation means FIG. 4 shows a schematic view of the electrical connections sending and receiving information in a system according to the invention. The logging tool 1 emits an interaction signal S1 from the radiating source 5, which interacts with the formation 30, resulting in the reaction signal S2 which is then detected by the detector 6, and the detector then transmits an output signal S3 to a processing unit 23. Depending on the output signal S3, the processing unit 23 controls the rotation unit 16 to rotate the second part 9 either faster or slower proportional to the output signal S3 to ensure that the output signal S3 always has a required quality that allows extraction of the information on the formation 30 requested by the user of the logging tool 1. If the output signal S3 does not have the required quality, the rotation of the second part 9 is decreased, allowing the detector 6 to detect signals from a specific radiated volume 53 of the surroundings for a longer period, thereby obtaining a higher count number to improve the signal-to-noise ratio.

During a quick or rough scan of the formation 30, the scan rate, i.e. speed with which the second part 9 is rotated, may on the contrary be increased, and therefore, it becomes apparent that a scan will always be a compromise between scan rate and scan quality.

Apart from the processing unit 23 controlling the rotation of the second part 9 to be proportional to the output signal S3, the processing unit 23 could also be coupled to the driving unit 41 to control the speed of the entire tool string 40 to be proportional to the output signal S3, such that if the output signal S3 does not have the required quality, the speed of the entire tool string 40 may be decreased, allowing the detector 6 to detect signals from a specific radiated volume 53 of the surroundings for a longer period, thereby obtaining a higher count number to improve the signal-to-noise ratio, and equivalently move faster if the resolution required by the user is smaller or the output signal S3 is higher.

The proportionality between the scan rate, i.e. the rotation of the second part 9 or the speed of the logging tool 1 in the longitudinal direction of the borehole 2, may be preset or calculated in the processing unit 23 or may be controlled uphole by the user during a scan, using the uphole data acquisition means 25. After processing the detected signal, the processed data are either stored locally in the tool 1 in a storage unit 24 or sent to surface for further processing or storage in the uphole data acquisition means 25 via an uphole-downhole information link 26. The resolution of the scan, i.e. the opening angle W1 defined by the shielding unit 12 and a collimating unit 13, may also be coupled proportionally to the output signal S3 of the detector 6 in order to prevent scans with a resolution too high from being able to give information on the formation, so that the opening angle is increased automatically or by the user by changing the position of the collimating unit 13 to increase the output signal S3 from the detector 6 and equivalently decrease the opening angle W1 to increase the resolution of the scan if the output signal S3 is sufficiently large.

In one logging tool 1 according to the invention, the radiating source 5 is comprised in the second part 9 and the detector 6 is comprised in the first part 8. The detector 6 then detects reaction signals S2 from all directions, and the volume 53 radiated by the radiating source 5 is limited by the screen 7. In another logging tool 1, the detector 6 is comprised in the second part 9 and the radiating source 5 is comprised in the first part 8, and the source then radiates the interactions signals S1 in all directions, whereby the volume 53 "seen" by the detector 6 is limited by the screen 7. The term the volume "seen" is used in the following to define the volume with which reaction signals S2 can be detected by the detector 6.

In yet another logging tool 1, the second part 9 comprises the radiating source 5 as well as the detector 6 so that both the source and the detector are rotated when rotating the second part 9, and so that and the volume 53 radiated by the radiating source 5 and the volume "seen" by the detector 6 are both limited by the screen 7. In a logging tool 1 according to the invention, the second part 9 comprises both the radiation source 5 and the detector 6, and two separate screens 7 are used; one for limiting the volume 53 radiated by the radiating source 5 and one for limiting the volume "seen" by the detector 6.

Figures 5A, 5B, 5C, 5D:
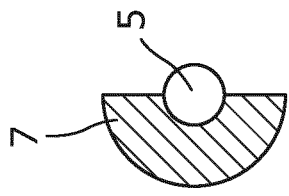
FIGS. 5a-5h show eight possible screens according to the invention.
Figures 5E, 5F, 5G, 5H:
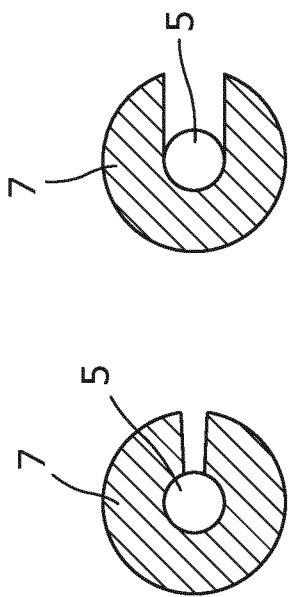

FIGS. 5a-5h show a variety of different embodiments of the screen 7. The screens 7 are shown in relation to the radiating source 5, but the source could also be replaced by the detector 6. In FIGS. 5a-5d, the screen 7 is shown as one unit 7 with different opening angles W1. In FIG. 5e, the screen 7 comprises two units; a shielding unit 12 having a fixed opening angle and a collimating unit 13 which is used to at least partially screen the interaction signal S1 confined in a direction by the shielding unit 12. In FIG. 5e, the collimating unit 13 is a cylindrical screen with a well-defined aperture which can be rotated around the longitudinal axis A1 of the tool 1 in relation to the shielding unit 12 in order to limit the opening angle W1 of the shielding unit 12 in a tangential direction.

In FIG. 5f, the screen 7 comprises two concentrical cylindrical screen units. The shielding unit 12 is formed as a cylinder and the collimating unit 13 is also formed as a cylinder, where the opening angle W1 is defined by the relative position between the shielding unit 12 and the collimating unit 13, and where the opening angle W1 is controlled by rotation of either of the screen units in order to control the size of the opening of the screen in the tangential direction. In FIG. 5h, the collimating unit 13 comprises a sliding panel 14 partially limiting the opening angle W1 of the shielding unit 12, and in FIG. 5g, the screen 7 comprises two sliding panels 14 limiting the opening angle W1 of the shielding unit 12 in order to control the size of the opening of the screen in the tangential direction. A collimating unit 13 collimating the opening of the screen 7 in the tangential direction will be termed a tangential collimating unit 33, and FIGS. 5e-5h show different embodiments of tangential collimating units.

FIG. 6 shows an embodiment of the screen 7 comprising an additional set of collimating units 13 for collimating the radiated interaction signal S1 in a longitudinal direction parallel to the longitudinal axis A1 of the tool 1. The additional set of collimating units 13 is two cylinders 15 which can be translated along the longitudinal axis A1 or be fixed in a position to partially limit the opening defined by the shielding unit 12 in order to control the size of the opening of the screen in the longitudinal direction. A collimating unit 13 collimating the opening of the screen 7 in the longitudinal direction will be termed a longitudinal collimating unit 34, and the collimating unit 15 shown in FIG. 6 is an embodiment of a longitudinal collimating unit.

The screen 7 may comprise a collimating unit 13 in the form of a projection or a groove on the shielding unit 12 or in the form of a plurality of projections or grooves on the shielding unit 12.

In another embodiment, the logging tool 1 comprises one or two collimating rings 15 made of a shielding material for collimating the interaction signal S1 in the longitudinal direction. Alternatively, the one or two collimating rings 15 may be placed so that they collimate the reaction signal S2. Both the radiating source 5 and the detector 6 may be collimated in the longitudinal direction by collimating rings 15.

In the logging tool 1, the collimating rings 15 may be movable in the longitudinal direction, which enables the user to collimate the investigated volume 53 in the longitudinal direction.

To modify the radiated interaction signal S1 in order to improve the usability of the signal, the radiated interaction signal S1 may pass through a monochromating unit before entering the formation 30. Other units modifying the interaction signal S1, such as a focusing unit, may also be used. The reaction signal S2 may also be filtered using a filter unit to improve the usability of the reaction signal S2.

When operating downhole using different tools, such as different logging tools, for creating correlated data on formational changes, casing characteristics, fluid flow characteristics etc., it is important to correlate the data by knowing the precise position of the tool 1 and tool string 40 in the borehole 2. The position of the tool 1 may therefore be determined by a conventional casing collar locator (CCL), and the position may subsequently be fed to the processing unit 23 to be able to correlate data from the different tools, e.g. regarding formational changes in a certain volume 53 of the formation 30. The determination of the position of the tool string 40 may be improved by using a gyroscopic unit logging acceleration data and transmitting these data to the processing unit 23.

Since the available data transfer between the surface and the tool 1 via the uphole-downhole information link 26 may be limited, the data obtained by the logging tool 1 may be pre-processed by the processing unit 23 before being sent to the uphole data acquisition means 25. Some data may also be stored locally in the tool 1 in a storing unit 24 to save data transfer, if some data is suitable for post-processing when the tool string 40 re-emerges to the surface.

The screen 7 may be made of a variety of neutron absorbers, such as, but not exclusively, lead, cadmium, hafnium, materials with high hydrogen content, water, plastics, concrete, boron and boron compounds can be used as neutron shielding material. Furthermore, the neutron shielding units may comprise a non-shielding material used to encapsulate the shielding material or to brace the shielding material.

As mentioned above, the tool 1, comprising a radiating source 5 and a detector 6, may use electromagnetic radiation for characterising the geological formation 30 surrounding the borehole. Advantageously, the electromagnetic radiation may be radiation within an X-ray spectrum or a gamma ray spectrum, e.g. with a frequency of $10^{16}$-$10^{21}$ Hz.

By fluid or well fluid is meant any kind of fluid that may be present in oil or gas wells downhole, such as natural gas, oil, oil mud, crude oil, water, etc. By gas is meant any kind of gas composition present in a well, completion, or open hole, and by oil is meant any kind of oil composition, such as crude oil, an oil-containing fluid, etc. Gas, oil, and water fluids may thus all comprise other elements or substances than gas, oil, and/or water, respectively.

By a casing is meant any kind of pipe, tubing, tubular, liner, string etc. used downhole in relation to oil or natural gas production.

Although the invention has been described in the above in connection with preferred embodiments of the invention, it will be evident for a person skilled in the art that several modifications are conceivable without departing from the invention as defined by the following claims.

The invention claimed is:

1. A logging tool for logging formational changes in a borehole, the logging tool having a longitudinal axis, comprising:
   a radiating source for emitting an interaction signal,
   a detector for detecting a reaction signal, and
   a screen for limiting a volume investigated by the radiating source and the detector,
   wherein the tool comprises a first part, a second part and a rotation unit, the second part comprising the radiating source and the detector, the second part being able to rotate around the longitudinal axis relative to the first part during use, and the second part comprising the screen, and wherein a speed of rotation of the second part is controlled by a rotation unit to be proportional to an output signal of the detector.

2. A logging tool according to claim 1, wherein the rotation unit, comprises an electrical motor unit.

3. A logging tool according to claim 1, wherein the radiating source is arranged off centre at an offset distance perpendicular to the longitudinal axis in the logging tool.

4. A logging tool according to claim 1, wherein a speed of the logging tool in a direction defined by the longitudinal axis of the tool is controlled by a driving unit to be proportional to an output signal of the detector.

5. A logging tool according to claim 1, wherein the screen limits a volume detectable by the detector when detecting the reaction signal.

6. A logging tool according to claim 1, wherein the screen limits a radiated volume.

7. A logging tool according to claim 1, wherein the screen comprises a shielding unit and at least a collimating unit, the collimating unit being able to shield at least apart of the surroundings not shielded by the shielding unit, and wherein a size of the slit opening can be controlled by changing the position of the at least one collimating unit.

8. A logging tool according to claim 7, wherein the screen comprises a shielding unit and at least a collimating unit, the shielding unit and the collimating unit being concentrically positioned, and wherein the size of the slit opening can be controlled by the shielding unit and at least one collimating unit rotating in relation to each other.

9. A logging tool according to claim 7, wherein the logging tool comprises at least two screens; one for the radiating source and one for the detector.

10. A logging tool according to claim 1, wherein the screen comprises a shielding unit, at least a tangential collimating unit and at least a longitudinal collimating unit, the tangential collimating unit being movable in a tangential direction in order to shield at least a part of the surroundings unshielded by the shielding unit, wherein the opening of the screen has a longitudinal dimension and a tangential dimension, wherein the tangential dimension of the opening of the screen can be controlled by changing the position of the at least a tangential collimating unit, and the longitudinal collimating unit being able to shield at least part of the surroundings unshielded by the shielding unit, and wherein a longitudinal dimension of the slit opening can be controlled by changing the position of the at least a longitudinal collimating unit.

11. A logging tool according to claim 1, further comprising a positioning unit, wherein calculation of a position of the logging tool within the borehole is possible.

12. A logging tool according to claim 1, further comprising a gyroscopic unit comprised within in the first part, wherein a calculated position of the logging tool is calibrated by means of the gyroscopic unit during use.

13. A logging tool according to claim 1, wherein a downhole data processing means for pre-processing acquired data downhole prior to sending information to an uphole data processing means.

14. A method of characterising a geological formation surrounding a borehole by a logging tool comprising:
   a) emitting a radiation signal from a radiation source towards the geological formation, such that the radiation signal interacts with the formation in a volume, thereby emitting a reaction signal,
   b) detecting the reaction signal with a detector,
   c) determining when the detected reaction signal succeeds a predetermined minimum count rate of the reaction signal,
   d) rotating a second part comprising the radiation source and the detector in relation to a first part,
   e) repeating steps a-d until the formation has been investigated in an entire radial circumference of the tool,
   f) moving the tool in the borehole in the longitudinal direction, and
   g) repeating steps a-f until the geological formation has been characterised in a desired length in the longitudinal direction.

* * * * *